Sept. 15, 1970      D. L. LILLEY, JR      3,528,189

FISH LURE

Filed June 3, 1968

INVENTOR
DAVID L. LILLEY JR.
BY
William L. Christoforo
ATTORNEY

United States Patent Office 3,528,189
Patented Sept. 15, 1970

3,528,189
FISH LURE
David L. Lilley, Jr., 8808 Loch Raven Blvd.,
Towson, Md. 21204
Filed June 3, 1968, Ser. No. 734,112
Int. Cl. A01k 85/00
U.S. Cl. 43—42.33      3 Claims

ABSTRACT OF THE DISCLOSURE

A fishing lure which includes a photographic, lithographic or similar representation of a bait fish contained in a clear plastic form having the exterior shape and surface structure of the bait fish. Right and left side views of the bait fish are suitably mounted on a clear backing material and processed by retouching to remove or omit certain sections of the representations, especially about the fish scales and gills so as to allow exposure of the clear backing. The right and left hand views are then attached back to back with a colorful reflective foil material sandwiched therebetween so as to show through the removed sections of the representation. A clear plastic form having the exterior shape of the bait fish is then sealed about the prepared representation to for a buoyant, waterproof lure. In a slightly different embodiment, the representations are embossed into a generally cylindrical shape of the bait fish before being encased in the clear plastic form.

BACKGROUND OF THE INVENTION

An accurate representation of a bait fish in a lure combined with the ability of the lure to reflect and flash in the available light as it is drawn through the water is known to be especially attractive and enticing to fish. Additionally, for the lure to be commercially attractive to a potential fisherman it must be capable of being inexpensively priced and must be relatively easy to use.

Certain lures are already known to those familiar with the art in which a bright reflecting foil material is encased in a clear plastic form approximating the shape of a bait fish. Improved versions of these lures have translucently painted sides through which the foil material reflects in order to produce a lure more closely resembling an actual bait fish and yet retain the enhancing qualities of the reflective material showing through the body of the lure. Other improvements have become known in the attempt to produce a lure which is an enhanced representation of a bait fish.

SUMMARY OF THE INVENTION

It is an object of this invention to provide a fishing lure that closely resembles an actual bait fish. Accordingly, a photograph or lithograph or other true representation scaled to suitable size of an actual bait fish is encased in a clear plastic form having the exterior shape of the bait fish.

Another object of this invention is to provide a fishing lure that closely resembles an actual bait fish which is enhanced so as to be more colorful and attractive than the actual bait fish. Accordingly, a photographic or lithographic or other true representation of an actual bait fish is suitably touched up through the use of known artist's techniques. If the photograph or similar representation is mounted on a clear backing, reworking of the representation so as to expose the backing will allow the use of sandwiched colorful reflective foil materials between right and left hand representations of the bait fish so that the completed lure, as it is drawn through the water, will flash in the available light.

It is an additional object of this invention to provide a fishing lure of the type described and additionally having reflective surfaces for catching and reflecting light when moved through the water.

DESCRIPTION OF THE PREFERRED EMBODIMENT

Figure 1:
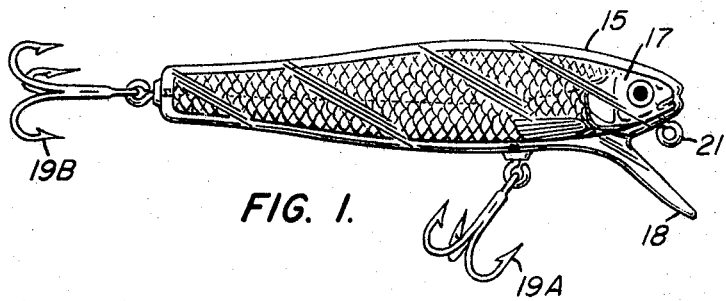
FIG. 1 is a plan view of a fishing lure manufactured in accordance with the teaching of this invention.

Referring to FIG. 1, a fishing lure manufactured in accordance with the teachings of this invention is comprised of a transparent Tenite plastic body 15 in which is encased a photograph of other representation 17 of a bait fish. A spoon 18 is suitably an integral part of the lure body 15. Hooks 19A and 19B and a swivel 21 are fastened in the conventional manner to prepared bosses in the lure body.

Figure 2:
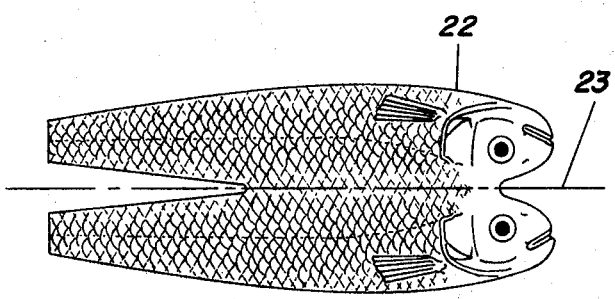
FIG. 2 is a plan view of a photograph of a bait fish.
Figure 3:
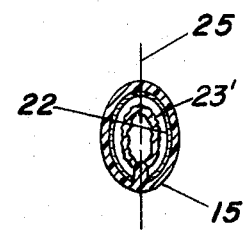
FIG. 3 shows a means of mounting the photograph of FIG. 2 in the lure of this invention.

Referring to FIG. 2, a right and left hand photograph 22 joined back to back of a bait fish are transferred to a clear plastic backing material. The photograph, which may be either in black and white, or more preferably in color, may now be touched up with retouch colors or transparent dyes to improve its lifelike appearance. Additionally, sections of the photograph, especially in the area of the scales and gills may be removed to expose the clear backing. The photograph is then lightly folded along line 23 and, referring to FIG. 3, inserted into body 15 of the fishing lure. Body 15 may be split along axis 25 or may have a detachable head in order to open the body for receipt of the photograph. The photograph 22, if properly proportioned, will assume a position against the inner surface of body 15 as shown. After the photograph has been mounted in the body, the body is sealed by known techniques so as to be waterproof.

Figure 4:
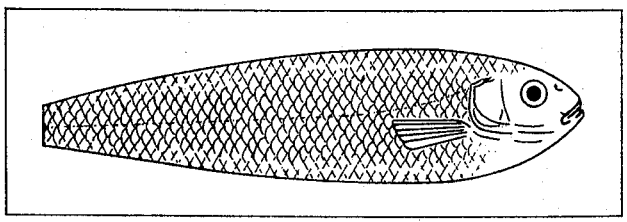
FIG. 4 is a plan view of a distorted representation of a bait fish suitable for embossing into a shape approximating the exterior shape of a bait fish.

FIG. 4 shows a representation of a bait fish which is distorted in its two dimensional form. When this representation is prepared as described above for use in a lure, it may be embossed and trimmed so that its back surface is concave and of a form to fit as an external skin 28A (referring to FIG. 5) on a core 30. Additionally, there may be sandwiched between representation 28A and core 30 a reflective, colorful insert 27A such as a silver or gold foil material. A clear plastic body 15A in which is suitably embossed scale, gill, etc. as might be found on the actual bait fish, is now cemented over the representation 28A. A similar but opposite hand, foil insert 27B, embossed representation 28B and clear plastic body 15B are fastened to the opposite side of the core 30 and the edges therebetween sealed.

Additionally, core 30 may be transparent or translucent and have outlined thereon the internal bodily structure of the bait fish so as to be visible from the exterior of the lure as these internal organs would be visible in the actual bait fish being simulated. It should be obvious that similar foil materials may be inserted between the photographs 22 in the lure constructed according to the teachings of FIG. 3 as illustrated by foil material 23.

Where this type of lure is to be mass produced, the photograph or other representation, after the art work and touch up have been performed is photolithographed onto the clear plastic backing. In this manner, the time consuming and expensive process of photographing and preparing the photograph need only be done once for each type of bait to be simulated and allowing multiple copies of the prepared bait fish representation to be made.

Figure 5:
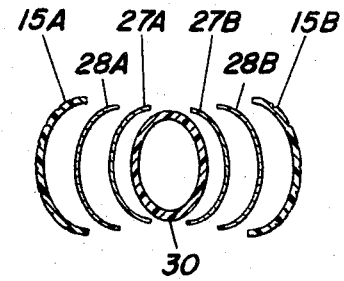
FIG. 5 shows a means of mounting the embossed representation of the bait fish shown in FIG. 4 in a fish lure.

Of course, the foil inserts can be omitted and, in the case of FIG. 5, the core 30 background colored and allowed to show through the clear backing of the fish representation. It is also possible, of course, to use an opaque representation so that nothing internal of the representation can be seen. Certain other modifications and changes can be made in my invention as I have embodied it without departing from my teachings therein.

The invention claimed is:
1. A simulation of an actual fish comprising:
   right and left hand representations of the fish to be simulated mounted on a clear plastic backing film and retouched in predetermined areas of said representation to allow said clear plastic backing to show through;
   a clear plastic body having a hollow cavity therein defining an internal surface of said body, and an external shape approximating the shape of the fish to be simulated and having mounted within said hollow cavity said right and left hand representations arranged back to back said representations being of the size to essentially cover said internal surface of said body; and,
   a colorful material sandwiched between said right and left hand representations within said hollow cavity.
2. A simulated fish as recited in claim 1 wherein said colorful, reflective material comprises a colorful, reflective foil material.
3. A simulated fish as recited in claim 1 wherein said colorful material comprises a core having an external shape and size approximating the shape and size of said cavity, said core being sealed within said cavity between said right and left hand representations.

References Cited

UNITED STATES PATENTS

| | | | |
|---|---|---|---|
| 2,573,592 | 10/1951 | Nickel | 43—42.33 X |
| 2,596,883 | 5/1952 | Wise | 43—42.33 |
| 2,599,035 | 6/1952 | Wing | 43—42.33 |
| 2,670,559 | 3/1954 | Webb et al. | 43—42.33 |
| 3,186,120 | 6/1965 | Layson | 43—42.33 X |

FOREIGN PATENTS

| | | |
|---|---|---|
| 462,209 | 1/1950 | Canada. |

WARNER H. CAMP, Primary Examiner